United States Patent
Memon et al.

(10) Patent No.: US 11,753,746 B2
(45) Date of Patent: Sep. 12, 2023

(54) PREPARATION METHOD OF A FABRIC

(71) Applicant: Paradise Textiles Ltd, Wuxi (CN)

(72) Inventors: Hafeezullah Memon, Wuxi (CN); Achala Herath, Wuxi (CN); Sunil Prakash, Wuxi (CN); Ashok Mahtani, Wuxi (CN)

(73) Assignee: Paradise Textiles Ltd, Wuxi (CN)

( * ) Notice: Subject to any disclaimer, the term of this patent is extended or adjusted under 35 U.S.C. 154(b) by 97 days.

(21) Appl. No.: 17/502,294

(22) Filed: Oct. 15, 2021

(65) Prior Publication Data

US 2023/0083800 A1 Mar. 16, 2023

(30) Foreign Application Priority Data

Sep. 10, 2021 (CN) .......................... 202111059627.0

(51) Int. Cl.
 *C07C 51/09* (2006.01)
 *C07C 51/64* (2006.01)
 (Continued)

(52) U.S. Cl.
 CPC .............. *D01G 11/00* (2013.01); *B29B 17/02* (2013.01); *B29B 17/0412* (2013.01); *D01D 5/08* (2013.01); *D01F 6/44* (2013.01); *D02G 3/045* (2013.01); *D03D 15/283* (2021.01); *D03D 35/00* (2013.01); *A41D 1/06* (2013.01); *A41D 31/18* (2019.02);
 (Continued)

(58) Field of Classification Search
 CPC . B29B 17/02; B29B 2017/0203; C07C 51/09; C07C 51/64; C07C 63/26; C07C 67/48; C07C 209/84; C08J 11/10; D01D 1/04; D01D 5/08; D01F 1/02; D01F 1/09; D01F 1/10; D01F 6/60; D01F 6/62; D01F 6/86; D02G 3/04; D02G 3/045; D03D 15/00; D03D 15/20; D03D 15/283;
 (Continued)

(56) References Cited

U.S. PATENT DOCUMENTS

2007/0129524 A1* 6/2007 Sunkara .................... D01F 6/70
 528/44
2018/0002837 A1* 1/2018 Yu ............................ D02G 3/02

FOREIGN PATENT DOCUMENTS

CN     103147152 A  *  6/2013  ............... D01F 6/60
EP     2722352 A1   *  4/2014  ............... C07C 67/08
 (Continued)

OTHER PUBLICATIONS

Translation of CN 103147152 A (published on Jun. 12, 2013).*
Translation of JP 11222739 A (published on Aug. 17, 1999).*

*Primary Examiner* — Leo B Tentoni
(74) *Attorney, Agent, or Firm* — Myers Bigel, P.A.

(57) ABSTRACT

The present disclosure provides a fabric, a preparation method thereof and clothing formed therefrom. The preparation method includes the following steps: obtaining bio-based synthetic fiber chips from textile waste materials; obtaining extruded filaments from the bio-based synthetic fiber chips by adopting a spinning solution; and weaving and interlocking the extruded filaments with bio-based elastic fibers to obtain the fabric. The prepared fabric is obtained from the textile waste materials, so that waste recycling is realized, and the pollution of the textile wastes to the environment is avoided. The spinning solution is adopted in the preparation process of the fabric, so that the opacity and hydrophilicity of the fabric can be enhanced.

10 Claims, 4 Drawing Sheets

(51) Int. Cl.
| | |
|---|---|
| C07C 63/26 | (2006.01) |
| C07C 67/48 | (2006.01) |
| C07C 209/84 | (2006.01) |
| C08J 11/10 | (2006.01) |
| D01D 1/04 | (2006.01) |
| D01F 1/02 | (2006.01) |
| D01F 1/09 | (2006.01) |
| D01F 1/10 | (2006.01) |
| D01F 6/60 | (2006.01) |
| D01F 6/62 | (2006.01) |
| D01F 6/86 | (2006.01) |
| D02G 3/04 | (2006.01) |
| D03D 15/00 | (2021.01) |
| D03D 15/20 | (2021.01) |
| D03D 15/56 | (2021.01) |
| D01G 11/00 | (2006.01) |
| D03D 15/283 | (2021.01) |
| B29B 17/02 | (2006.01) |
| B29B 17/04 | (2006.01) |
| D01D 5/08 | (2006.01) |
| D01F 6/44 | (2006.01) |
| D03D 35/00 | (2006.01) |
| A41D 31/18 | (2019.01) |
| A41D 1/06 | (2006.01) |

(52) U.S. Cl.
CPC .. *B29B 2017/0203* (2013.01); *D10B 2331/02* (2013.01); *D10B 2331/04* (2013.01); *D10B 2331/12* (2013.01); *D10B 2401/061* (2013.01); *D10B 2501/04* (2013.01)

(58) Field of Classification Search
CPC ............... D03D 15/56; D10B 2331/02; D10B 2331/04; D10B 2401/061
USPC ... 264/103, 171.1, 211, 331.19, 331.21, 913, 264/920; 139/420 R, 421, 426 R, 420 A; 521/48, 48.5, 49.8; 560/78; 562/485, 562/486; 564/498, 511
See application file for complete search history.

(56) References Cited

FOREIGN PATENT DOCUMENTS

| | | | | |
|---|---|---|---|---|
| JP | 11222739 A | * | 8/1999 | ............... D02G 3/04 |
| WO | WO-2021168402 A | * | 8/2021 | ............. C07C 51/09 |

\* cited by examiner

PREPARATION METHOD OF A FABRIC

RELATED APPLICATION(S)

The present application claims priority to and the benefit of Chinese Patent Application No. 202111059627.0, filed Sep. 10, 2021, the disclosure of which is hereby incorporated herein in its entirety.

TECHNICAL FIELD

The present invention relates to the technical field of the textile industry, and in particularly, relates to a fabric, a preparation method thereof, and clothing formed therefrom.

BACKGROUND

The textile industry contributes to environmental pollution during the production process of textiles and after actual use of the textile materials. Due to rapid changes in fashion and changes in people's condition, age, or weather, many textile materials are wasted before their useful life. In addition, most textile wastes are dumped or incinerated, thereby further contributing to environmental pollution.

SUMMARY

The present invention provides a preparation method of a fabric. The preparation method includes the following steps: obtaining bio-based synthetic fiber chips formed from textile waste materials; obtaining extruded filaments from the bio-based synthetic fiber chips by adopting a spinning solution; and weaving and interlocking the extruded filaments with bio-based elastic fibers serving as basic filaments to obtain the fabric.

Optionally, in some embodiments, the bio-based synthetic fiber chips include polyethylene terephthalate chips and nylon chips; and the step of obtaining the bio-based synthetic fiber chips from the textile waste materials includes the following steps: recovering polyethylene terephthalate and nylon from the textile wastes; depolymerizing the polyethylene terephthalate into dimethyl terephthalate; reacting the dimethyl terephthalate with bio-based-MEG (mono-ethylene glycol) to obtain the polyethylene terephthalate chips; depolymerizing the nylon into adipic acid; and reacting the adipic acid with bio-based 1, 5-pentane diamine to obtain the nylon chips.

Optionally, in some embodiments, a step of purifying the dimethyl terephthalate is carried out after depolymerizing the polyethylene terephthalate into dimethyl terephthalate and before reacting the dimethyl terephthalate with bio-based-MEG; and a step of purifying the adipic acid is carried out after depolymerizing the nylon into adipic acid and before reacting the adipic acid with bio-based 1, 5-pentane diamine.

Optionally, in some embodiments, the dimethyl terephthalate is purified based on a closed-loop recrystallization process, and the adipic acid is purified based on the closed-loop recrystallization process.

Optionally, in some embodiments, the spinning solution comprises ethyl carbamate, TiO2, diethylene glycol, acrylonitrile-butadiene-styrene, carbon black and a tackifier.

Optionally, in some embodiments, before weaving and interlocking the extruded filaments with bio-based elastic fibers serving as basic filaments, the bio-based elastic fibers and the extruded filaments are respectively positioned on two opposite sides of a weaving center line.

Optionally, in some embodiments, the bio-based elastic fibers include transparent spandex filaments.

In some embodiments, the present invention further provides a fabric, and the fabric is prepared by adopting the preparation method of the fabric in any one of the abovementioned embodiments.

In some embodiments, the invention further provides clothing, and the clothing is prepared utilizing the prepared fabric in any one of the abovementioned embodiments.

The fabric, the preparation method thereof and the clothing formed therefrom may provide certain advantages such as providing a fabric that is obtained from textile waste materials, so that waste recycling is realized, and the pollution of the textile wastes to the environment is avoided. In addition, adopting the spinning solution into the preparation process of the fabric may provide a fabric with enhanced opacity and hydrophilicity.

DETAILED DESCRIPTION

The technical scheme in the embodiments of the present invention will be clearly and completely described below in conjunction with the accompanying drawings.

The basic principle of the invention defined in the following description can be applied to other embodiments, modifications, improvements, equivalents, and other technical schemes that do not deviate from the spirit and scope of the invention.

The textile industry creates pollution during the production process of textiles and after actual use of the textiles. Due to rapid changes in fashion and changes in people's condition, age, or weather, most textile materials are wasted even before their useful life. In addition, most textile wastes are dumped or incinerated; both of them creating further environmental pollution. The sustainability issues urge these textiles to be renewed, recycled, or reused. This inspired the preparation of synthetic fibers from recycled textile wastes.

In addition, due to the possibility of mass production and better overall performance than natural fibers, conventional synthetic textiles are considered as the most economical and efficient daily necessities. In addition, the market is expected to rise in the future. Generally, the synthetic fibers have a certain degree of translucency and high light transmittance, which limits the use of more delicate fabrics and light colors by fashion designers. Traditionally, coarse, multi-layer fabrics or thick chemical coatings are used to avoid high light transmittance; however, each approach has its shortcomings.

Figure 1:
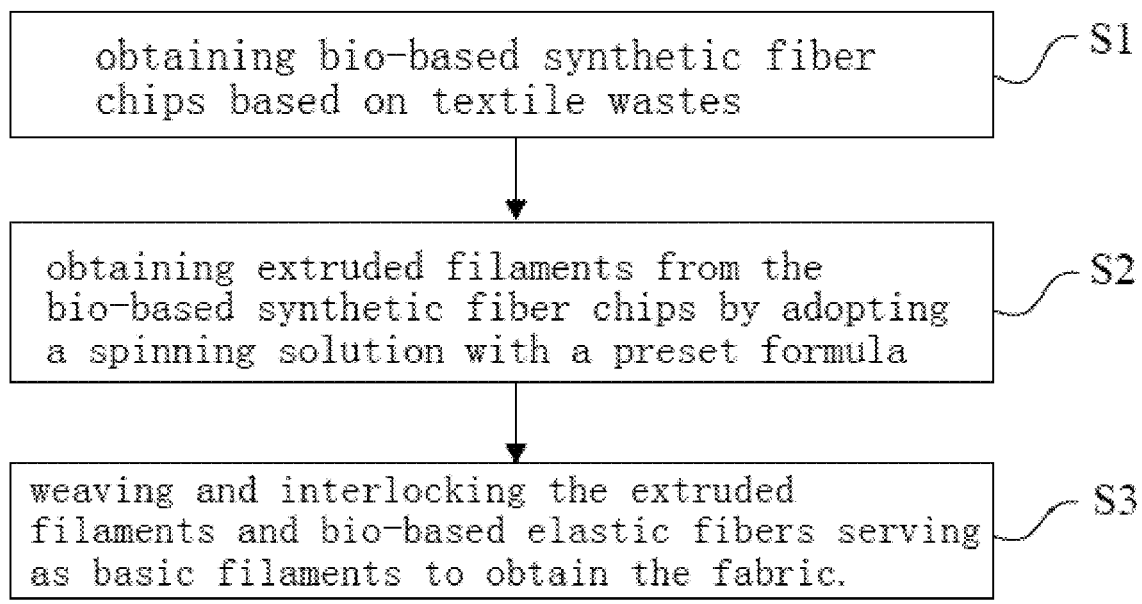
FIG. 1 is an example flow diagram of the preparation method of the fabric according to embodiments of the present invention.

Referring to FIG. 1, embodiments of the present invention provide a preparation method of a fabric. In some embodiments, the preparation method comprises the following steps:

obtaining bio-based synthetic fiber chips based on textile wastes (S1).

obtaining extruded filaments from the bio-based synthetic fiber chips by adopting a spinning solution with a preset formula (S2); and weaving and interlocking the extruded filaments with bio-based elastic fibers serving as basic filaments to obtain the fabric (i.e., a prepared fabric) (S3).

As used herein, the term "bio-based" refers to materials and/or chemicals derived from renewable biological resources.

According to some embodiments of the preparation method of the fabric of the present invention, the fabric may be obtained from textile wastes, so that waste recycling is realized, and the pollution of the textile wastes to the environment may be avoided. In some embodiments, the spinning solution with the preset formula may be adopted into the preparation process of the fabric, so that the opacity and hydrophilicity of the prepared fabric can be enhanced.

Figure 2:
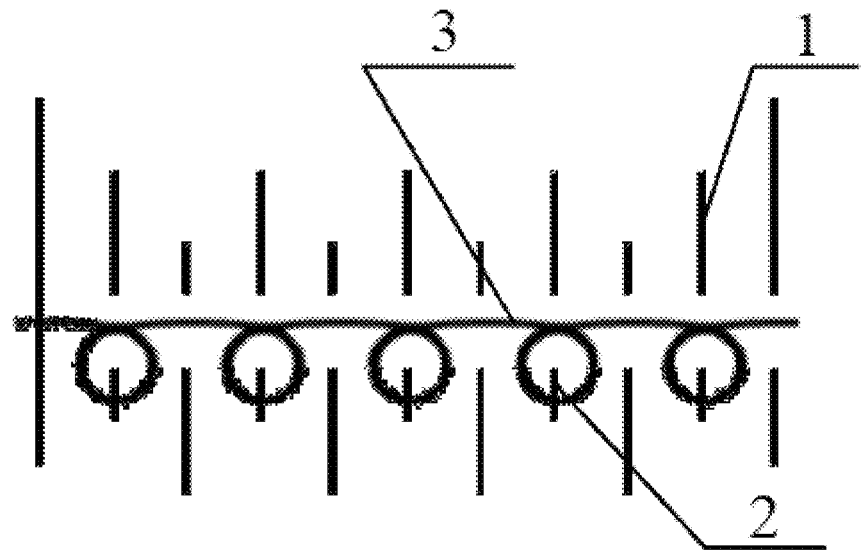
FIG. 2 and FIG. 3 are example schematic diagrams illustrating before weaving and interlocking the extruded filaments and bio-based elastic fibers serving as basic filaments, the bio-based elastic fibers and the extruded filaments are respectively positioned on two opposite sides of a weaving center line in the preparation method according to embodiments of the present invention.
Figure 3:
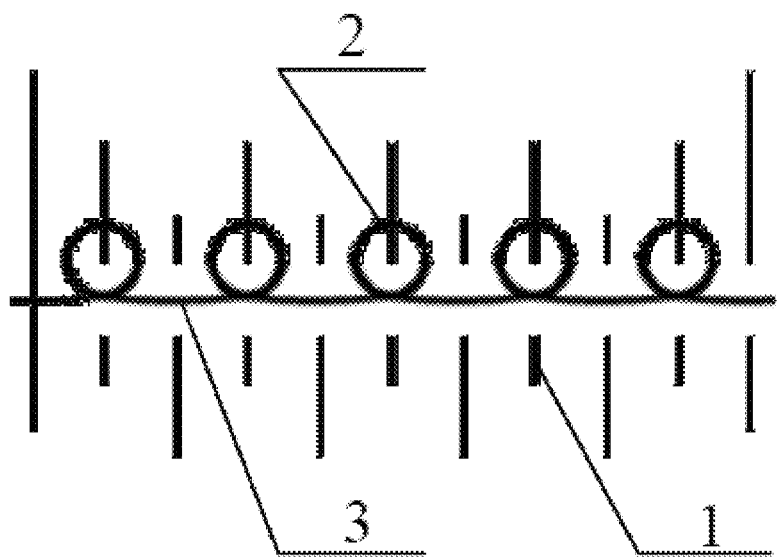
Figure 4:
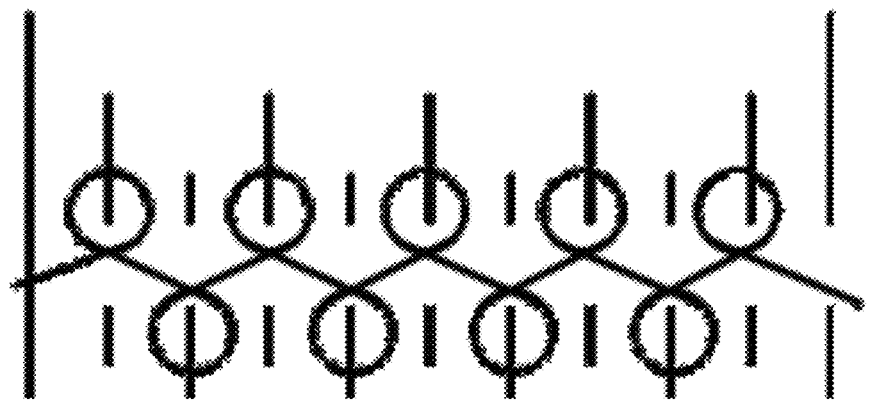
FIG. 4 is an example schematic diagram illustrating the woven filaments obtained after weaving and interlocking the extruded filaments and bio-based elastic fibers serving as basic filaments in the preparation method of the fabric according to embodiments of the present invention.

Referring to FIG. 2 to FIG. 4 in conjunction with FIG. 1, some embodiments provide an alternative preparation method of a fabric. In some embodiments, the preparation method of the fabric is similar to the preparation method of the fabric described above, except the preparation method may further include the following content.

For example, in some embodiments, the bio-based synthetic fiber chips may include polyethylene terephthalate chips and/or nylon chips. In some embodiments, the step (S1) of obtaining the bio-based synthetic fiber chips based on the textile wastes may comprises the following additional steps:

recovering polyethylene terephthalate and nylon from the textile wastes (S11).

depolymerizing the polyethylene terephthalate into dimethyl terephthalate at the molecular level (S12);

reacting the dimethyl terephthalate with bio-based-MEG (mono-ethylene glycol) to obtain the polyethylene terephthalate chips (S13);

depolymerizing the nylon into adipic acid at the molecular level (S14); and/or reacting the adipic acid with bio-based 1, 5-pentane diamine to obtain the nylon chips (S15).

It should be noted that the specific steps sequence of step S1 is not limited by the sequence of the steps S11 to S15, and in other embodiments, the specific steps sequence of the step S1 can be adjusted according to actual needs.

For example, in some embodiments, a step of purifying the dimethyl terephthalate may be carried out after depolymerizing the polyethylene terephthalate into dimethyl terephthalate at the molecular level and before reacting the dimethyl terephthalate with bio-based-MEG; that is, the step of purifying the dimethyl terephthalate may be further included between step S12 and step S13. Depolymerizing to obtain dimethyl terephthalate (with respect to polyethylene terephthalate) and adipic acid (with respect to nylon) eliminates dyestuff and other chemicals found in the textile waste materials. In some embodiments, a step of purifying the adipic acid may be carried out after depolymerizing the nylon into adipic acid at the molecular level and before reacting the adipic acid with bio-based 1, 5-pentane diamine; that is, the step of purifying the adipic acid may be further included between step S14 and step S15.

In some embodiments, the dimethyl terephthalate may be purified based on a closed-loop recrystallization process. In some embodiments, the adipic acid may be purified based on the closed-loop recrystallization process.

In some embodiments, the spinning solution with the preset formula may comprise ethyl carbamate, $TiO_2$, diethylene glycol, acrylonitrile-butadiene-styrene (ABS), carbon black, and a tackifier. In some embodiments, ethyl carbamate may be present in the spinning solution in an amount of about 0.5 g/L to about 1.5 g/L. For example, in some embodiments, ethyl carbamate may be present in the spinning solution in an amount of 0.5 g/L, 0.6 g/L, 0.7 g/L, 0.8 g/L, 0.9 g/L, 1 g/L, 1.1 g/L, 1.2 g/L, 1.3 g/L, 1.4 g/L or 1.5 g/L. In some embodiments, $TiO_2$ may be present in the spinning solution in an amount of about 3 g/L to about 6 g/L. For example, in some embodiments, $TiO_2$ may be present in the spinning solution in an amount of 3 g/L, 3.1 g/L, 3.2 g/L, 3.3 g/L, 3.4 g/L, 3.5 g/L, 3.6 g/L, 3.7 g/L, 3.8 g/L, 3.9 g/L, 4 g/L, 4.1 g/L, 4.2 g/L, 4.3 g/L, 4.4 g/L, 4.5 g/L, 4.6 g/L, 4.7 g/L, 4.8 g/L, 4.9 g/L, 5 g/L, 5.1 g/L, 5.2 g/L, 5.3 g/L, 5.4 g/L, 5.5 g/L, 5.6 g/L, 5.7 g/L, 5.8 g/L, 5.9 g/L or 6 g/L. In some embodiments, diethylene glycol may be present in the spinning solution in an amount of about 0.5 g/L to about 1.5 g/L. For example, in some embodiments, diethylene glycol may be present in the spinning solution in an amount of 0.5 g/L, 0.6 g/L, 0.7 g/L, 0.8 g/L, 0.9 g/L, 1 g/L, 1.1 g/L, 1.2, g/L, 1.3 g/L, 1.4 g/L or 1.5 g/L. In some embodiments, acrylonitrile-butadiene-styrene may be present in the spinning solution in an amount of about 0.5 g/L to about 1.5 g/L. For example, in some embodiments, acrylonitrile-butadiene-styrene may be present in the spinning solution in an amount of 0.5 g/L, 0.6 g/L, 0.7 g/L, 0.8 g/L, 0.9 g/L, 1 g/L, 1.1 g/L, 1.2 g/L, 1.3 g/L, 1.4 g/L or 1.5 g/L. In some embodiments, carbon black may be present in the spinning solution in an amount of about 0.5 g/L to about 1.5 g/L. For example, in some embodiments, carbon black may be present in the spinning solution in an amount of 0.5 g/L, 0.6 g/L, 0.7 g/L, 0.8 g/L, 0.9 g/L, 1 g/L, 1.1 g/L, 1.2, g/L, 1.3 g/L, 1.4 g/L or 1.5 g/L. In some embodiments, the tackifier may be present in the spinning solution in an amount of about 0.5 g/L to about 2.5 g/L. For example, in some embodiments, the tackifier may be present in the spinning solution in an amount of 0.5 g/L, 0.6 g/L, 0.7 g/L, 0.8 g/L, 0.9 g/L, 1 g/L, 1.1 g/L, 1.2 g/L, 1.3 g/L, 1.4 g/L, 1.5 g/L, 1.6 g/L, 1.7 g/L, 1.8 g/L, 1.9 g/L, 2 g/L, 2.1 g/L, 2.2 g/L, 2.3 g/L, 2.4 g/L or 2.5 g/L.

The spinning solution of the preset formula may enhance the opacity of polyethylene terephthalate (PET) filaments and increases the hydrophilicity and recyclability of the prepared fabric.

Specifically, since the spinning solution of the preset formula is added during spinning solution dyeing, sewn light-colored clothes maintain unique properties (like softness, hydrophilicity, and opacity) even after several washings. In addition, an unpleasant chemical layer for an opaque or hydrophilic coating material can be avoided.

In some embodiments, the density of the extruded filaments can be between about 20 deniers and about 150 deniers, and specifically, the density of the extruded filaments can be 20 deniers, 30 deniers, 40 deniers, 50 deniers, 60 deniers, 70 deniers, 80 deniers, 90 deniers, 100 deniers, 110 deniers, 120 deniers, 130 deniers, 140 deniers or 150 deniers.

Figure 5:
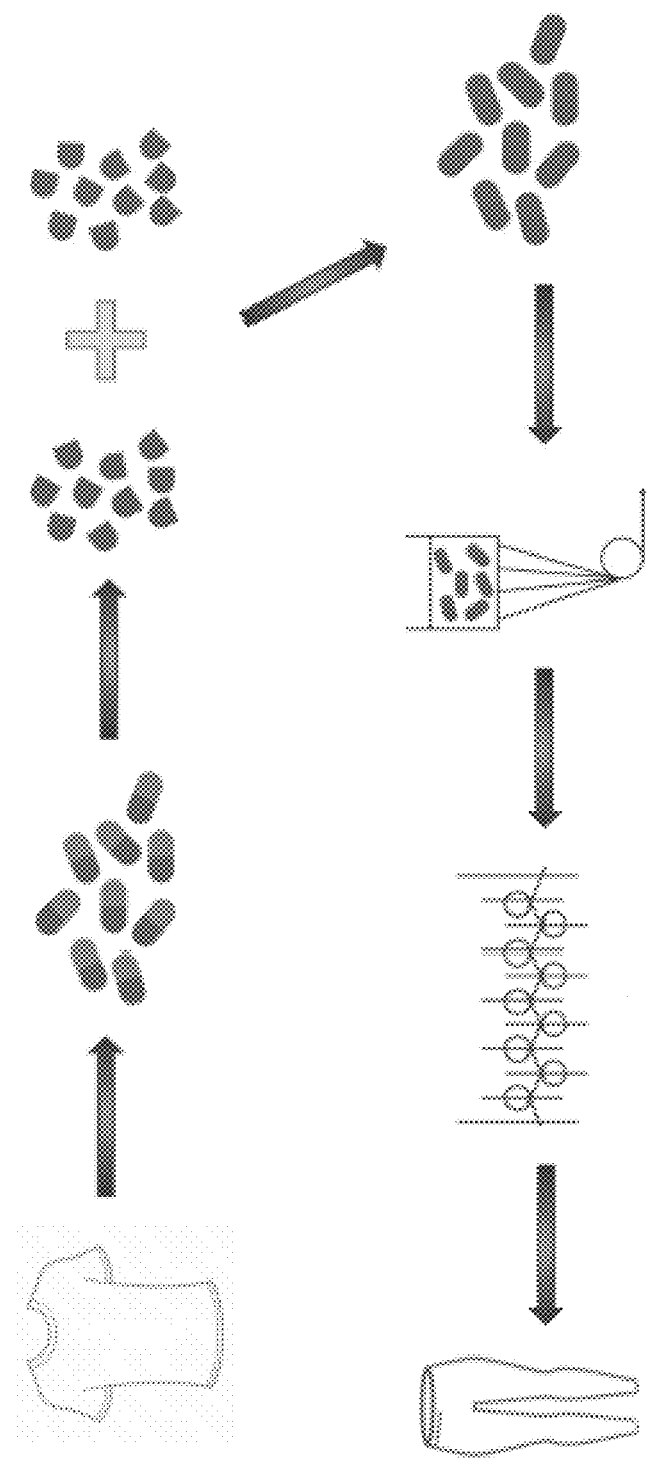
FIG. 5 is an example flow diagram illustrating the preparation of clothing according to embodiments of the present invention.

As examples, as shown in FIG. 2 and FIG. 3, according to embodiments of the present invention, before weaving and interlocking the extruded filaments 2 and bio-based elastic fibers 1 serving as basic filaments, the bio-based elastic fibers 1 and the extruded filaments 2 are respectively positioned on two opposite sides of a weaving center line 3. The woven filaments obtained after the bio-based elastic fiber 1 and the extruded filament 2 are woven and interlocked, for example, as shown in FIG. 5.

In some embodiments, the bio-based elastic fibers 1 can comprise transparent spandex or elastane filaments.

In some embodiments, light-colored opaque bio-based clothes may be produced by using the transparent spandex filaments as basic filaments and double-sided weaving and interlocking the extruded filaments with regular light-colored filaments. In some embodiments, the extruded filaments and normal filaments are retained only on each side and do not appear on the other side, as shown in FIG. 2 to FIG. 4. The stretch and fabric structure are based on the woven filaments as shown in FIG. 4. The gloss of the prepared fabric is very dark, and thus, the fabric is opaque.

In some embodiments, the transparent spandex filaments may be used as the basic filaments, and the extruded filaments are double-sided woven with the transparent spandex filaments so that the transparent spandex filaments and the extruded filaments may not protrude on the other side. The transparent spandex filaments not only combine the two layers of woven fabrics, but also provides stretchability for the woven fabric. Finally, clothes, like the tops and the bottoms, can be prepared (e.g., sewn) by the prepared fabric, and the transparency and hydrophilicity are examined.

According to some embodiments, the present invention also provides a fabric which is prepared by the preparation method described herein in any one of the abovementioned embodiments.

According to other embodiments, the present invention also provides clothing which are prepared utilizing the prepared fabric according to any one of the abovementioned embodiments. An example flow diagram of the preparation of clothes according to embodiments of the present invention is shown in FIG. 5.

For example, as shown in FIG. 5, depolymerization of the synthetic fibers from textile waste materials was achieved to obtain dimethyl terephthalate or adipic acid. Next, the dimethyl terephthalate or adipic acid is purified by a simple closed-loop recrystallization process, in which all the solvents were reclaimed for subsequent use to react with a bio-based monomer. Next, partially bio-based synthetic fibers chips were formed by reacting bio-based MEG or 1,5-pentane diamine and reclaimed purified dimethyl terephthalate or adipic acid. The obtained recycled bio-based synthetic fibers chips are used to extrude polyester or nylon filaments from a unique dope recipe (i.e., spinning solution with preset formula described herein) that enhanced the opacity and adds hydrophilicity and recyclability to the polyester or nylon filaments. Finally, extruded filaments may be double knitted interlocked with regular light-colored filament (e.g., transparent spandex) as the base filament to make light-colored opaque bio-based recycled garments.

In some embodiments, the prepared fabric of the present invention has a very soft hand feel due to a double-sided woven structure resulting from the count of spun yarn; in addition, the front side of the prepared fabric has a very light color, making it aesthetically pleasing. Finally, a light-colored opaque hydrophilic recycled synthetic fabric having a partial bio-based content may be sewn to form the clothes. The prepared fabric of the present invention has long-lasting softness, hydrophilicity, and opacity, without any unpleasant loose chemical coating, lining fabric, or multi-layer fabric even after repeated washing. Compared to other fabrics, a fabric not using the spinning solutions of the preset formulas according to embodiments of the present invention appears translucent. In contrast, the prepared fabric of the present invention having all similar technical parameters and colors and utilizing the spinning solution of the preset formula according to embodiments of the present invention has opacity. Likewise, this effect is observed in the case of clothing formed from the prepared fabric according to embodiments of the present invention. Clothing manufactured by methods described herein has opacity and ensures invisibility of the underwear under it, such conditions are not possible for traditional clothes having the same technical parameters. In addition, the present invention provides better moisture management and permeability due to the hydrophilicity imparted in the inner layer of the fabric.

Although the application of the present invention is not necessarily limited to clothes (tops and bottoms), it may be applicable to important environments where similar characteristics are required. In addition, the scope of the present invention may be not limited to the two mentioned synthetic fibers, namely polyester and nylon, but may also be applied to other synthetic materials. Interestingly, this function can be fine-tuned according to customer needs by changing the spinning solution formula during melt spinning.

The present invention aims to recycle traditional synthetic fibers, synthesize part of bio-based fibers from textile wastes and promote the endowing of additional functions (including opacity and hydrophilicity). The proposed product is sustainable, has a low carbon footprint and is more functional than traditional fossil fuel-based synthetic fibers.

For those skilled in the art, it is obvious that the invention is not limited to details of the above exemplary embodiments and can be implemented in other specific forms without departing from the spirit or basic characteristics of the invention. Therefore, the embodiments should be regarded as exemplary and non-limiting from any point, the scope of the invention is defined by appended claims rather than the above description, and thus all changes within the meaning and scope of equivalent elements of the claims are included in the invention. Any reference signs in the claims should not be regarded as the claims involved in the limitation.

In addition, although the specification is described according to the implementation mode, not each embodiment only includes an independent technical scheme, the description mode of the specification is only for clarity, and those skilled in the art should take the specification as a whole, and the technical schemes in the various embodiments can also be properly combined to form other implementation modes which can be understood by the those skilled in the art.

That which is claimed is:

1. A preparation method of a fabric, the method comprising:
   obtaining bio-based synthetic fiber chips from textile waste materials;
   obtaining extruded filaments from the bio-based synthetic fiber chips through a spinning solution comprising ethyl carbamate, TiO2, diethylene glycol, acrylonitrile-butadiene-styrene, carbon black and a tackifier; and
   weaving and interlocking the extruded filaments with bio-based elastic fibers to obtain the fabric.

2. The method according to claim 1, wherein the bio-based synthetic fiber chips include polyethylene terephthalate chips and nylon chips; and the step of obtaining the bio-based synthetic fiber chips from textile waste materials further comprises:
  recovering polyethylene terephthalate and nylon from the textile waste materials;
  depolymerizing the polyethylene terephthalate into dimethyl terephthalate;
  reacting the dimethyl terephthalate with bio-based-MEG to obtain the polyethylene terephthalate chips;
  depolymerizing the nylon into adipic acid; and
  reacting the adipic acid with bio-based 1, 5-pentane diamine to obtain the nylon chips.

3. The method according to claim 2, the method further comprising:
  purifying the dimethyl terephthalate after depolymerizing the polyethylene terephthalate into dimethyl terephthalate and before reacting the dimethyl terephthalate with bio-based-MEG; and
  purifying the adipic acid after depolymerizing the nylon into adipic acid and before reacting the adipic acid with bio-based 1, 5-pentane diamine.

4. The method according to claim 3, wherein the dimethyl terephthalate is purified based on a closed-loop recrystallization process, and the adipic acid is purified based on the closed-loop recrystallization process.

5. The method according to claim 1, wherein before weaving and interlocking the extruded filaments with the bio-based elastic fibers, the bio-based elastic fibers and the extruded filaments are respectively positioned on two opposite sides of a weaving center line.

6. The method according to claim 1, wherein the bio-based elastic fibers comprise transparent spandex filaments.

7. A preparation method of a fabric, the method comprising:
  obtaining bio-based synthetic fiber chips from textile waste materials, wherein the bio-based synthetic fiber chips include polyethylene terephthalate chips and nylon chips;
  recovering polyethylene terephthalate and nylon from textile waste materials;
  depolymerizing the polyethylene terephthalate into dimethyl terephthalate;
  reacting the dimethyl terephthalate with bio-based-MEG to obtain polyethylene terephthalate chips;
  depolymerizing the nylon into adipic acid;
  reacting the adipic acid with bio-based 1, 5-pentane diamine to obtain nylon chips;
  obtaining extruded filaments from the polyethylene terephthalate chips and the nylon chips through a spinning solution; and
  weaving and interlocking the extruded filaments with bio-based elastic fibers to obtain the fabric,
  wherein the spinning solution comprises ethyl carbamate, TiO2, diethylene glycol, acrylonitrile-butadiene-styrene, carbon black and a tackifier.

8. The method according to claim 7, the method further comprising:
  purifying the dimethyl terephthalate after depolymerizing the polyethylene terephthalate into dimethyl terephthalate and before reacting the dimethyl terephthalate with bio-based-MEG; and
  purifying the adipic acid after depolymerizing the nylon into adipic acid and before reacting the adipic acid with bio-based 1, 5-pentane diamine.

9. The method according to claim 8, wherein the dimethyl terephthalate is purified based on a closed-loop recrystallization process, and the adipic acid is purified based on the closed-loop recrystallization process.

10. The method according to claim 7, wherein before weaving and interlocking the extruded filaments with the bio-based elastic fibers, the bio-based elastic fibers and the extruded filaments are respectively positioned on two opposite sides of a weaving center line.

\* \* \* \* \*